(12) United States Patent
Loh et al.

(10) Patent No.: US 6,908,950 B2
(45) Date of Patent: Jun. 21, 2005

(54) ASPHALT FILLED POLYMER FOAM

(75) Inventors: Roland R. Loh, Stow, OH (US);
Barbara A. Fabian, Strongsville, OH (US); Sheree L. Bargabos, Toledo, OH (US); Mitchell Z. Weekley, Tallmadge, OH (US); Byron J. Hulls, Reynoldsburg, OH (US); J. Patrick Rynd, Stow, OH (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 0 days.

(21) Appl. No.: 10/033,493

(22) Filed: Oct. 25, 2001

(65) Prior Publication Data

US 2003/0100621 A1 May 29, 2003

(51) Int. Cl.$^7$ .................................. C08J 9/00
(52) U.S. Cl. ............................ 521/79; 521/81; 521/83; 521/146
(58) Field of Search .............................. 521/83, 79, 146, 521/81

(56) References Cited

U.S. PATENT DOCUMENTS

| | | | |
|---|---|---|---|
| 3,206,419 A | | 9/1965 | Pritchard et al. |
| 3,839,518 A | | 10/1974 | Rubens et al. |
| 4,010,123 A | * | 3/1977 | Blunt et al. |
| 4,287,117 A | | 9/1981 | Theysohn et al. |
| 4,795,763 A | | 1/1989 | Gluck et al. |
| 5,210,105 A | | 5/1993 | Paquet et al. |
| 5,240,968 A | | 8/1993 | Paquet et al. |
| 5,397,807 A | | 3/1995 | Hitchcock et al. |
| 5,476,899 A | | 12/1995 | Funaki et al. |
| 5,571,847 A | | 11/1996 | Hitchcock et al. |
| 5,679,718 A | | 10/1997 | Suh et al. |
| 5,854,295 A | | 12/1998 | Suh et al. |
| 6,110,985 A | * | 8/2000 | Wheeler |

FOREIGN PATENT DOCUMENTS

| | | |
|---|---|---|
| JP | 4638698 | 11/1971 |
| JP | 56145940 | 11/1981 |
| JP | 57147510 | 9/1982 |
| JP | 60096616 | 5/1985 |
| JP | 2204994 | 8/1990 |
| JP | 6107839 | 4/1994 |
| WO | WO 90/06339 | 6/1990 |

* cited by examiner

*Primary Examiner*—Morton Foelak
(74) *Attorney, Agent, or Firm*—Inger H. Eckert; Stephen W. Barns; Maria C. Gasaway

(57) ABSTRACT

This invention relates to foam insulating products, particularly extruded polystyrene foam, containing asphalt as an infrared attuation and process additives for improving the insulating properties and for reducing the manufacturing cost of the foam products.

6 Claims, 4 Drawing Sheets

100 μm

ASPHALT FILLED POLYMER FOAM

TECHNICAL FIELD

The present invention relates to rigid foamed polymeric boards containing infrared attenuating additives to increase insulating capability and decrease thermal conductivity. More particularly, it relates to rigid foamed polymeric board wherein asphalt is added to increase insulating capability of the polymeric foamed board.

BACKGROUND

The usefulness of rigid foamed polymeric boards in a variety of applications is well known. For instance, polymeric foam boards are widely used as isulating structural members. In the past, infrared attenuating agents (IAAs) such as carbon black powdered amorphous carbon, graphite, and titanium dioxide have been used as fillers in polymeric foam boards to minimize material thermal coductivity which, in turn, will maximize insulating capability (increase R-value) for a given thickness. Thermal conductivity, k is defined as the the ratio of the heat flow per unit cross-sectional to the temperature drop per unit thickness with the US unit:

$$\frac{Btu \cdot in}{Hr \cdot Ft^2 \cdot {}^\circ F.}$$

And the metric unit:

$$\frac{W}{m \cdot k}$$

The heat transfer through an insulating material can occur through solid conductivity, gas conductivity, radiation, and convection. The total thermal resistance (R-value), R is the measure of the resistance to heat transfer, and is determined as:

$$R = t/k$$

Where, t=thickness.

Japanese patent application, JP 57-147510, describes the use of carbon black in rigid polyurethane foam, and with maximum carbon black levels under 0.7 weight percent, a less than 4% reduction of K-factor is achieved.

U.S. Pat. No. 4,795,763 describes a carbon black filled foam with at least 2%, preferably 2 to 10% by weight of carbon black. The carbon black has a mean particle diameter of from about 10 to 150 nanometers. The K-factor of the foam is reduced by at least about 5%.

More recently, U.S. Pat. No. 5,679,718 disclosed an evacuated, open cell, microcellular foam containing an infrared attenuating agent to provide a greater proportional reduction in foam thermal conductivity. The '718 patent discusses a mostly open cell, about 90 percent or more, and small cell, less than 70 micrometers, polymer foams. The infrared attenuating agent comprises carbon black, and graphite at about 1 to 20 weight percent based upon polymer weight.

WO 90/06339, relates to styrene polymer foam containing carbon black 1 to 20 weight percent which having a particle size of from 10 to 100 nanometers and a surface area of 10–15,000 $m^2/g$, wherein the foam is expanded or molded expanded particles.

All of the above patents teach foams having decreased thermal conductivity. However, carbon black is a thermal conductive material, thus the thermal conductivity of the carbon black-filled foams may be increased with high loading of the carbon black. Further, the hydrophilic nature of carbon black makes it difficult to disperse evenly into polymer without a process aid, and results related large and open cells as well.

Rigid foamed plastic boards are extensively used as thermal insulating materials for many applications. It is highly desirable to improve the thermal conductivity without increasing the density, and/or the thickness of foam product. Particulary, the architectural community desires a foam board having a thermal resistance value of R=10, with a thickness of less than 1.8", for cavity wall construction, to keep at least 1" of the cavity gap clean.

Thus, there is a need to provide a polymeric foam product having decreased material thermal conductivity (K-factor) to provide a foam product with increased insulation value (R-value) without increasing the density and/or thickness of the polymeric foam product.

SUMMARY

The present invention relates to foam insulating products, such as extruded or expanded polystyrene foam, containing asphalt as an infrared attenuating agent and process additive to improve the thermal insulation, and to retain other properties as well. The asphalt can be uniformly blended easily throughout the polymer. The asphalt-filled polystyrene foams of the present invention decrease of both the initial and the aged thermal conductivity, or inversely, increase the thermal resistance (R value). This invention relates to foam insulating products, particularly extruded polystyrene foam, containing asphalt as an infrared attuation and process additives for improving the insulating properties and for reducing the manufacturing cost of the foam products.

Rigid foam cells are made up of two structural parts, cell walls and cell struts. In rigid foams, the struts are closed, restricting airflow and improving thermal efficiency. As shown in FIG. 2, the cell walls are the relatively straight edge portions and the struts are formed at the intersections of the cell wall. The present invention teaches a closed cell, rigid, polymer foam filled with 0.1 to 15% by weight of asphalt as an infrared attenuating agent and process additive, based on the weight of the polymer in the foam, the asphalt being uniformly blended throughout the polymer so that the asphalt is present in the cell walls and cell struts. In a preferred embodiment, 0.5 to 3% asphalt (by weight) is used to improve the aged thermal conductivity of the foam to below the aged thermal conductivity of a corresponding unfilled foam.

Carbon black or some other infrared attenuation agents may reduce the radiation portion, thus decrease the thermal conductivity of the carbon black-filled polymer foam. However, carbon black is highly conductive material, and it tends to increase the solid conductive portion, thus result, the total thermal conductivity of the carbon black-filled one may be increased with high loading of the carbon black. Further, the prior art does not recognize that the hydrophilic nature of carbon black makes it difficult to disperse evenly into polymer without a process aid.

Table 1 shows the spectral color differences between carbon black and asphalt in thermoplastics. One of the most widely used perceptual color fidelity metric is the Delta E metric, given as part of the International Commission on Illumination standard color space specification. To measure perceptual difference between two lights using this metric, the spectral power distribution of the two lights are first converted to XYZ representations, which reflect (within a linear transformation) the spectral power sensitivities of the three cones on the human retina. Then, the XYZ values are transformed into a space, in which equal distance is supposed to correspond to equal perceptual difference (a "perceptually uniform" space). Then, the perceptual difference between the two targets can be calculated by taking the Euclidean distance of the two in this space. The difference is expressed in "Delta E" units. One Delta E unit represents approximately the threshold detection level of the color difference. If Delta E is less than one, the human eye cannot detect it.

TABLE 1

|  | Carbon Black - Ampact 0.5 wt % | Carbon Black - Americhem 0.5 wt % | Asphalt 0.5 wt % | Asphalt 2 wt % |
|---|---|---|---|---|
| Delta E | 2.82 | reference | 3.52 | 3.68 |

It is an object of the present invention to produce an asphalt filled, rigid polymer foam with a combination of other additives which exhibits overall compound effects on foam properties including improved thermal conductivity (decreased K-factor), and improved insulating value (increased R-value) for a given thickness and density.

It is another object of the present invention to produce an asphalt-filled, rigid polymer foam having retained or improved compressive strength, thermal dimensional stability, fire resistance, and water absorption properties.

It is another object of the present invention to provide an infrared attenuating agent which also acts as a process additive, to control the cell size and the rheology of polymer during foaming process, for use in the production of a rigid polymer foam.

It is another object of the invention to provide a polymeric foam with higher insulation value (R value) per given thickness to better meet architectural community needs and building energy code requirements.

It is another object of the present invention to lower the cost of a polymeric foam product in a simple and economical manner, such as by using asphalt as a low cost, functional colorant.

The foregoing and other advantages of the invention will become apparent from the following disclosure in which one or more preferred embodiments of the invention are described in detail and illustrated in the accompanying drawings. It is contemplated that variations in procedures, structural features and arrangement of parts may appear to a person skilled in the art without departing from the scope of or sacrificing any of the advantages of the invention.

DETAILED DESCRIPTION OF INVENTION

Figure 1:
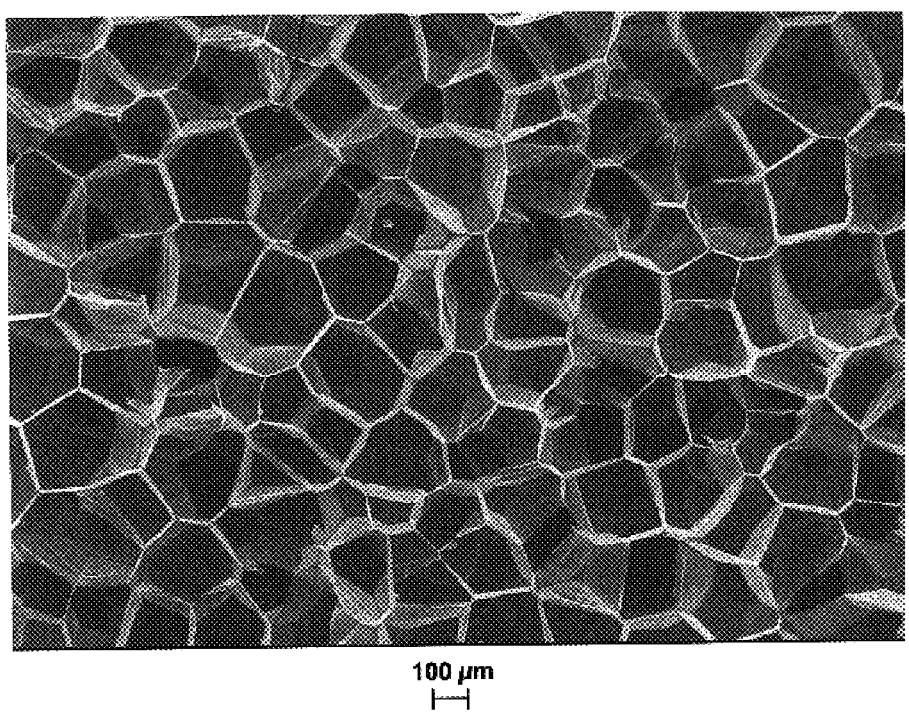
FIG. 1 is a scanning electron microscope (SEM) image the cell morphology of the polystyrene foam containing 3% asphalt (run#468-3).

The above objects have been achieved through the development of a rigid plastic foam which contains asphalt to improve the thermal insulation, and to retain other properties as well. The present invention particularly relates to the production of a rigid, closed cell, polymer foam prepared by extruding process with asphalt, blowing agent and other additives.

The rigid foamed plastic materials may be any such materials suitable to make polymer foams, which include polyolefins, polyvinylchloride, polycarbonates, polyetherimides, polyamides, polyesters, polyvinylidene chloride, polymethylmethacrylate, polyurethanes, polyurea, phenol-formaldehyde, polyisocyanurates, phenolics, copolymers and terpolymers of the foregoing, thermoplastic polymer blends, rubber modified polymers, and the like. Suitable polyolefins include polyethylene and polypropylene, and ethylene copolymers.

A preferred thermoplastic polymer comprises an alkenyl aromatic polymer material. Suitable alkenyl aromatic polymer materials include alkenyl aromatic homopolymers and copolymers of alkenyl aromatic compounds and copolymerizable ethylenically unsaturated comonomers. The alkenyl aromatic polymer material may further include minor proportions of non-alkenyl aromatic polymers. The alkenyl aromatic polymer material may be comprised solely of one or more alkenyl aromatic homopolymers, one or more alkenyl aromatic copolymers, a blend of one or more of each of alkenyl aromatic homopolymers and copolymers, or blends of any of the foregoing with a non-alkenyl aromatic polymer.

Suitable alkenyl aromatic polymers include those derived from alkenyl aromatic compounds such as styrene, alphamethylstyrene, ethylstyrene, vinyl benzene, vinyl toluene, chlorostyrene, and bromostyrene. A preferred alkenyl aromatic polymer is polystyrene. Minor amounts of monoethylenically unsaturated compounds such as $C_{2-6}$ alkyl acids and esters, ionomeric derivatives, and $C_{4-6}$ dienes may be copolymerized with alkenyl aromatic compounds. Examples of copolymerizable compounds include acrylic acid, methacrylic acid, ethacrylic acid, maleic acid, itaconic acid, acrylonitrile, maleic anhydride, methyl acrylate, ethyl acrylate, isobutyl acrylate, n-butyl acrylate, methyl methacrylate, vinyl acetate and butadiene.

Preferred structures comprise substantially (i.e., greater than 95 percent) and most preferably entirely of polystyrene. The present invention relates to a process for preparing a foam product involving the steps of forming a foamable mixture of (1) polymers having weight -average molecular weights from about 30,000 to about 500,000. In one embodiment, the polystyrene has weight-average molecular weight about 250,000, and (2) an asphalt, with or without other compound effective additives, (3) a blowing agent, (4) other process additives, such as a nucleation agent, flame retardant chemicals, foaming the mixture in a region of atmosphere or reduced pressure to form the foam product. The following embodiments show the advantage of high thermal insulation value by adding asphalt in rigid polystyrene foam.

Any suitable blowing agent may be used in the practice on this invention. Blowing agents useful in the practice of this invention include inorganic agents, organic blowing agents and chemical blowing agents. Suitable inorganic blowing agents include carbon dioxide, nitrogen, argon, water, air, nitrogen, and helium. Organic blowing agents include aliphatic hydrocarbons having 1–9 carbon atoms, aliphatic alcohols having 1–3 carbon atoms, and fully and partially halogenated aliphatic hydrocarbons having 1–4 carbon atoms. Aliphatic hydrocarbons include methane, ethane, propane, n-butane, isobutane, n-pentane, isopentane, and neopentane. Aliphatic alcohols include, methanol, ethanol, n-propanol, and isopropanol. Fully and partially halogenated aliphatic hydrocarbons include fluorocarbons, chlorocarbons, and chlorofluorocarbons. Examples of fluorocarbons include methyl fluoride, perfluoromethane, ethyl fluoride, 1,1-difluoroethane (HFC-152a), 1,1,1-trifluoroethane (HFC-143a), 1,1,1,2-tetrafluoro-ethane (HFC-134a), pentafluoroethane, difluoromethane, perfluoroethane, 2,2-difluoropropane, 1,1,1-trifluoropropane, perfluoropropane, dichloropropane, difluoropropane, perfluorobutane, and perfluorocyclobutane. Partially halogenated chlorocarbons and chlorofluorocarbons for use in this invention include methyl chloride, methylene chloride, ethyl chloride, 1,1,1-trichloroethane, 1,1-dichloro-1-fluoroethane(HCFC-141b),1-chloro-1,1-difluoroethane (HCFC-142b), chlorodifluoromethane (HCFC-22), 1,1-dichloro-2,2,2-trifluoroethane (HCFC-123) and 1-chloro-1,2,2,2-tetrafluoroethane (HCFC-124), and the like. Fully halogenated chlorofluorocarbons include trichloromonofluoromethane (CFC-11), dichlorodifluoromethane (CFC-12), trichlorotrifluoroethane (CFC-113), 1,1,1-trifluoroethane, pentafluoroethane, dichlorotetrafluoroethane (CFC-114), chloroheptafluoropropane, and dichlorohexafluoropropane. Chemical blowing agents include azodicarbonamide, azodiisobutyro-nitrile, benzenesulfonhydrazide, 4,4-oxybenzene sulfonyl-semicarbazide, p-toluene sulfonyl semi-carbazide, barium azodicarboxylate, and N,N'-dimethyl-N,N'-dinitrosoterephthalamide and trihydrazino triazine. In the present invention it is preferable to use 8 to 14% by weight based on the weight of the polymer HCFC-142b or 4 to 12% of HFC-134a with 0 to 3% ethanol. Alternatively 3 to 8% carbon dioxide with 0 to 4% lower alcohol, which include ethanol, methanol, propanol, isopropanol and butanol.

Optional additives which may be incorporated in the extruded foam product include additionally infrared attenuating agents, plasticizers, flame retardant chemicals, pigments, elastomers, extrusion aids, antioxidants, fillers, antistatic agents, UV absorbers, etc. These optional additives may be included in any amount to obtain desired characteristics of the foamable gel or resultant extruded foam products. Preferably, optional additives are added to the resin mixture but may be added in alternative ways to the extruded foam manufacture process.

The rigid polystyrene foam has improved thermal insulating properties. Unlike most infrared attenuating agents (IAAs) which increase polymer viscosity during extruding process, asphalt decreases the polymer viscosity. The flow rate of melted polymer through an orifice, described as melt flow index, or simply melt index (MI) tested according to ISO 1133:1977(E). The melt flow index can be used as a characteristic parameter related to molecular weight and viscosity of the polymer (FIG. 1). A small amount of asphalt demonstrates the benefit of improved thermal insulation value (R/inch). Typically, the amount of asphalt ranges from about 0.1% to 15%, preferably from 0.5% to 3% by weight on the base polymer. The asphalt may be any petroleum-derived asphalt with a softening point from about 105 to about 155° C. One particularly suitable asphalt for use in the rigid foams of the present invention is granulated asphalt, such as SU 7606, (Owens Corning, Trumbull, Ohio, USA) with a particle size around 2.4 mm (8 mesh), and softening point of about 123° C. The granulated asphalt can be added directly into the molten polymer during the extrusion process, or pre-blended with polystyrene beads, or pre-compound with up to 60% loading, typically about 30% of asphalt blended with polymer, then extruded and chopped into pellets, or beads.

Preferable additives include silicates (e.g. talc, mica), oxides (e.g. copper (II) oxide, iron (III) oxide, manganese (IV) oxide), and group IB, IIB, IIIA, IVA chemical elements (e.g. carbon, aluminum), with a particle size from less than 100 nanometer up to about 10 microns. The asphalt also helps to prevent agglomeration of these additives, including inorganic IAAs, and nucleation agents, and serves as a dispersion aid as well.

The extruded foam product may be prepared by any means known in the art such as with an extruder, mixer, blender, or the like, such as the method disclosed in co-pending patent application Ser. No. 09/451,617 herein incorporated by reference. The plastified resin mixture, containing asphalt, polymer, infrared attenuating agents and other additives, are heated to the melt mixing temperature and thoroughly mixed. The melt mixing temperature must be sufficient to plastify or melt the polymer. Therefore, the melt mixing temperature is at or above the glass transition temperature or melting point of the polymer. Preferably, in the preferred embodiment, the melt mix temperature is from 200 to 280° C., most preferably about 220 to 240° C. depending on the amount of asphalt.

A blowing agent is then incorporated to form a foamable gel. The foamable gel is then cooled to a die melt temperature. The die melt temperature is typically cooler than the melt mix temperature, in the preferred embodiment, from 100 to about 150° C., and most preferably from about 110 to about 120° C. The die pressure must be sufficient to prevent prefoaming of the foamable gel, which contains the blowing agent. Prefoaming involves the undesirable premature foaming of the foamable gel before extrusion into a region of reduced pressure. Accordingly, the die pressure varies depending upon the identity and amount of blowing agent in the foamable gel. Preferably, in the preferred embodiment, the pressure is from 40 to 70 bars, most preferably around 50 bars. The expansion ratio, foam thickness per die gap, is in the range of 20 to 70, typically about 60.

Figure 2:
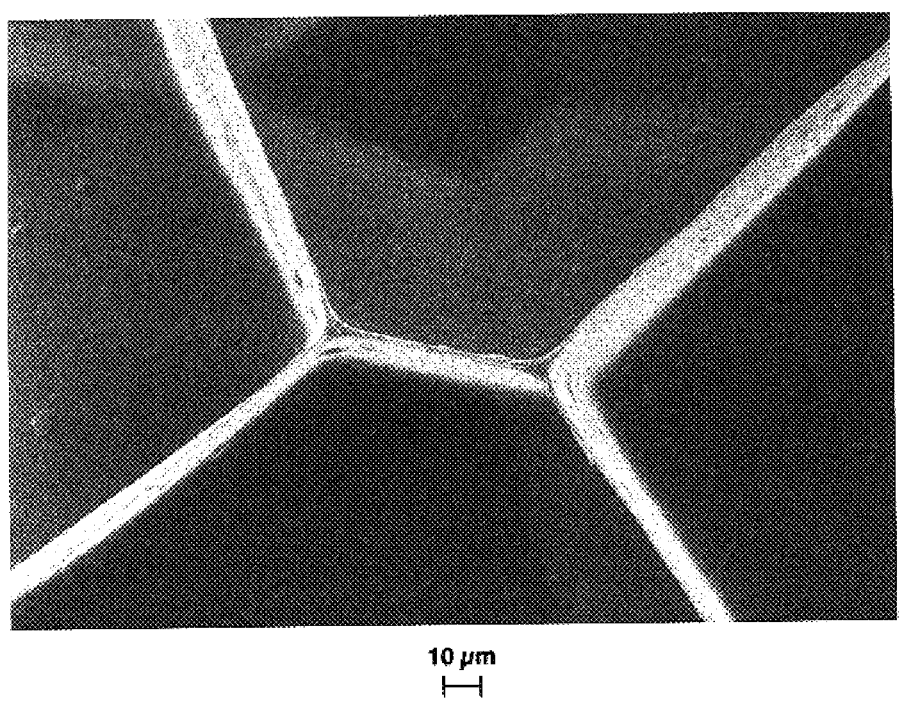
FIG. 2 is an SEM image of the wall and strut of the polystyrene foam containing 3% asphalt.
Figure 3:
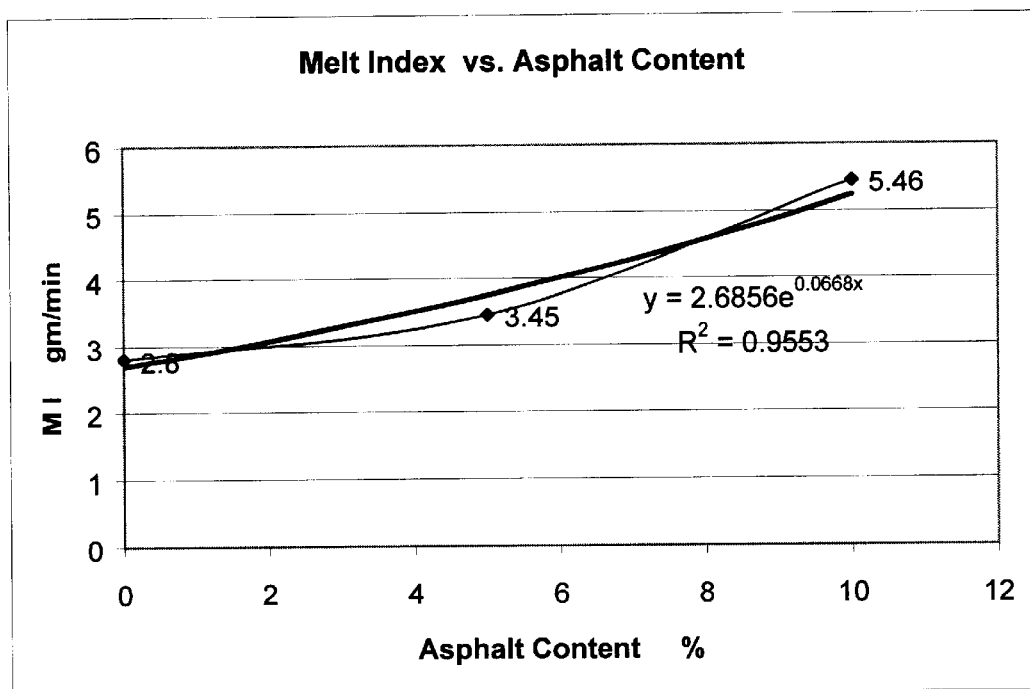
FIG. 3 is a graphical illustration showing the melt index difference of the polymer with and without the asphalt.

In a preferred embodiment, an extruded polystyrene polymer foam is prepared by twin-screw extruders (low shear) with flat die and plate shaper. Alternatively, a single screw tandem extruder (high shear) with radial die and slinky shaper can be used. Asphalt is added into the extruder along with polystyrene, a blowing agent, and/or a nucleation agent, a fire retardant, an infrared attenuating agent by multi-feeders. The asphalt can be uniformly blended throughout the polymer in the extruding process, thus resulting a homogeneous foam structure (FIGS. 2 and 3).

The following are examples of the present invention, and are not to be construed as limiting.

EXAMPLES

The invention is further illustrated by the following examples in which all foam boards were 1.5" in thickness, and all R-values were 180 day aged R-value, unless otherwise indicated. In the following examples and control examples, rigid polystyrene foam boards were prepared by a twin screw LMP extruder with a flat die and shaper plate. Vacuum was applied in the extrusion processes.

Table 2, a summary of Table 3, shows the process conditions for examples and control example without asphalt additive in a twin-screw extruder. Asphalt used was Trumbull #3706 granulated asphalt (Owens Corning) which is formulated from petroleum-based materials processed to have a high softening point, around 240° F. (ASTM D-36). The polystyrene resins used were 70% polystyrene having a melt index of 3 and the 30% polystyrene, having a melt index of 18.8 (both from DelTech, with molecular weight, Mw about 250,000). The composite melt index was around 7.8 in compound. Stabilized hexabromocyclododecane (Great Lakes Chemical, HBCD SP-75) was used as flame retardant agent in the amount of 1% by the weight of the solid foam polymer.

TABLE 2

|  | Examples 1–10 | Control Example (Examples 11–12) |
|---|---|---|
| Wt. % of asphalt | 1 to 5 | 0 |
| Wt. % of talc | 0.5–1.5 | 1.4–1.6 |
| Wt. % of nano-carbon black | 0 to 6 | 0 |
| Wt. % of mica | 0 to 4 | 0 |
| Wt. % of HCFC-142b | 11 | 10–11 |
| Wt. % of $CO_2$ | 0 | 0–0.5 |
| Extruder Pressure, Kpa (psi) | 13000–17000 (1950–2400) | 15800 (2290) |
| Die Melt Temperature, ° C. | 117–123 | 121 |
| Die Pressure, Kpa (psi) | 5400–6600 (790–950) | 5600 (810) |
| Line Speed, m/hr (ft/min) | 110–170 (6–9.5) | 97 (5.3) |
| Throughput, kg/hr | 100 | 100 |
| Die Gap, mm | 0.6–0.8 | 0.8 |
| Vacuum KPa (inch Hg) | 0–3.4 (0 to 16) | 3.39 (15.2) |

The results of above examples and control examples, and a comparative example of the convention process without adding asphalt, are shown in Table 3.

TABLE 3

| Example # | R-value 10 days K · m$^2$/W (F · ft$^2$ · hr/Btu) | Aged R-value 180 days K · m$^2$/K (F · ft$^2$ · hr/Btu) | Density Kg/m3 (pcf) | Cell Anisotropic Ratio* K = z/(xyz)$^{1/3}$ | Average Cell micron | Talc Wt. % | Other Additives Wt. % | Asphalt Wt % |
|---|---|---|---|---|---|---|---|---|
| 1 | 1.156 (6.57) | 0.986 (5.60) | 26.72 (1.67) | 0.92 | 270 | 1 | 0 | 1 |
| 2 | 1.142 (6.49) | 0.973 (5.53) | 27.04 (1.69) | 0.94 | 280 | 1 | 0 | 2 |
| 3 | 1.153 (6.55) | 0.98 (5.57) | 26.08 (1.63) | 0.94 | 290 | 1 | 0 | 3 |
| 4 | 1.144 (6.50) | 0.975 (5.54) | 25.44 (1.59) | 0.93 | 290 | 1 | 0 | 4 |
| 5 | 1.104 (6.27) | 0.961 (5.46) | 25.92 (1.62) | 0.90 | 240 | 1.5 | 0 | 5 |
| 6 | 1.151 (6.54) | 0.996 (5.66) | 33.44 (2.09) | 0.95 | 250 | 1.5 | 0 | 5 |
| 7 | 1.146 (6.51) | 0.968 (5.5) | 32.32 (2.02) | 1.01 | 200 | 0.75 | 4 Mica | 4 |
| 8 | 1.192 (6.77) | 1.008 (5.73) | 27.68 (1.73) | 0.92 | 240 | 0.5 | 2.1 CB** | 2.1 |
| 9 | 1.153 (6.55) | 1.007 (5.72) | 28.64 (1.79) | 1.00 | 180 | 1 | 4 CB | 2 |
| 10 | 1.228 6.98 | 1.033 4.87 | 29.76 (1.86) | 0.97 | 190 | 1 | 3 CB | 2 |
| 11 | 1.024 (5.82) | 0.885 (5.03) | 27.68 (1.73) | 1.02 | 240 | 1.6 | 0 | 0 |
| 12 | 0.998 (5.67) | 0.889 (5.05) | 23.2 (1.45) | 0.97 | 250 | 1.4 | 0 | 0 |

Figure 4:
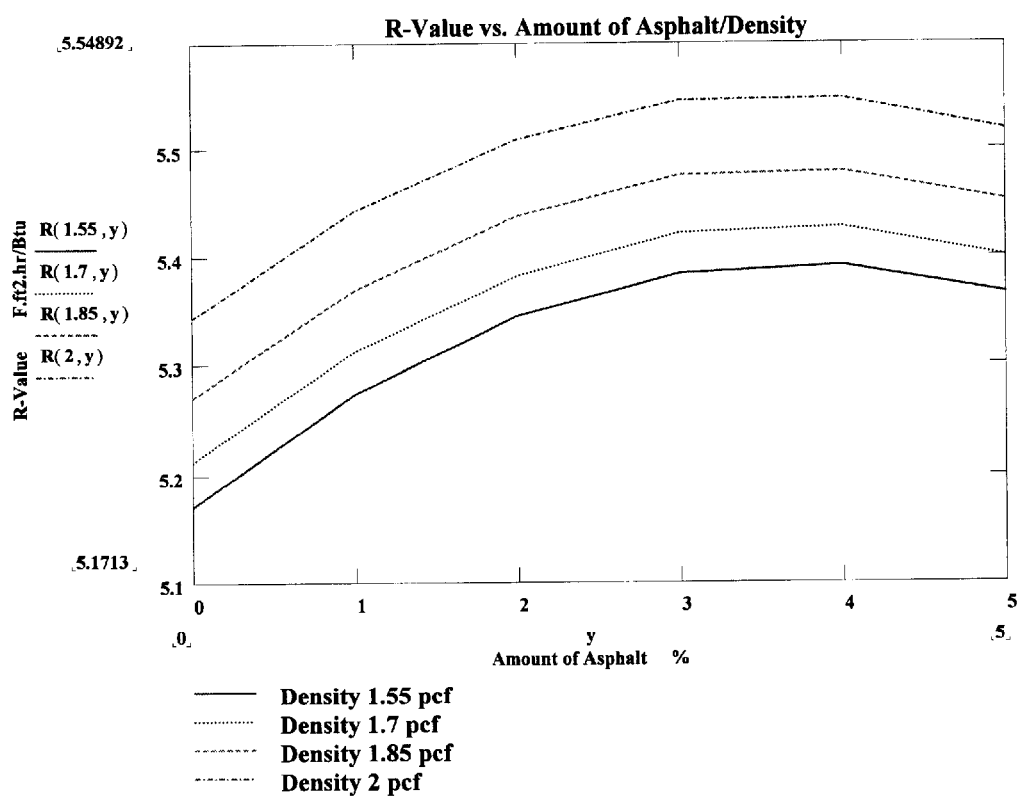
FIG. 4 is a graph, showing test results from 38 trials, related to R-value vs. amount of asphalt of polystyrene foam boards with several density levels, over a period of 180 days.

*where, x, an average cell size in the longitudinal (extruding) direction, y, cell size in the transverse direction, and z, cell size in the board thickness direction
**CB, nano-carbon black As shown in Table 3, the addition of asphalt in foaming processing, preferably 1 to 3% by weight of the solid foam polymer, with or without additional additives improved the thermal resistance property of the polystyrene foam board products by 5 to 18%. Based on the test data from 38 samples, a multi-variable regression calculation yields the R-value vs. Amount of Asphalt as shown in FIG. 4, which shows an R-value increase of 2 to 8% the addition of from 1 to 5% by weight asphalt in comparison with projected R-values of same cell structure, without asphalt-filled polymer foams with different foam densities.

What is claimed is:

1. A process for making an extruded polymer foam comprising the steps of:
    a) heating to a melt mixing temperature, a resin mixture comprising polystyrene, an infrared attenuating agent and asphalt into foamable gel;
    b) incorporating one or more blowing agents into the resin mixture under a pressure sufficient to prevent prefoaming of the gel;
    c) cooling the gel to a die melt temperature; and
    d) extruding the gel through a die to a region of lower die pressure to form the foam.

2. The process of claim 1, wherein the asphalt is added in amount of from about 0.1 to about 15% by weight based on the polymer.

3. The process of claim 2, wherein the asphalt is added in an amount of from about 1 to about 4% by weight based on the polymer.

4. The process of claim 1, wherein the asphalt has a softening point of from about 105° C. to about 155° C.

5. The process of claim 1, further including the step of adding one or more additives selected from the group consisting of infrared attenuating agents, plasticizers, flame retardant chemicals, pigments, elastomers, extrusion aids, antioxidants fillers, antistatic agents and UV absorbers.

6. The process of 1, further comprising the step of adding an infrared attenuating agent selected from the group consisting of silicates, oxides, and group IB, IIB, IIIA, IVA chemical elements.

* * * * *